US012619020B2

(12) United States Patent
Pires et al.

(10) Patent No.: US 12,619,020 B2
(45) Date of Patent: May 5, 2026

(54) METHOD OF GENERATING A SPATIALLY LIMITED FILM STACK ON A LIGHT SENSOR ELEMENT

(71) Applicant: ROLIC TECHNOLOGIES AG, Allschwil (CH)

(72) Inventors: David Pires, Giebenach (CH); Richard Frantz, Village-Neuf (FR)

(73) Assignee: ROLIC TECHNOLOGIES AG, Allschwil (CH)

(*) Notice: Subject to any disclaimer, the term of this patent is extended or adjusted under 35 U.S.C. 154(b) by 229 days.

(21) Appl. No.: 18/274,360

(22) PCT Filed: Jan. 26, 2022

(86) PCT No.: PCT/EP2022/051668
§ 371 (c)(1),
(2) Date: Jul. 26, 2023

(87) PCT Pub. No.: WO2022/167271
PCT Pub. Date: Aug. 11, 2022

(65) Prior Publication Data

US 2024/0125993 A1 Apr. 18, 2024

(30) Foreign Application Priority Data

Feb. 2, 2021 (EP) .................................... 21154779

(51) Int. Cl.
*G02B 5/30* (2006.01)
*G01J 1/04* (2006.01)
*G01J 4/04* (2006.01)

(52) U.S. Cl.
CPC .......... *G02B 5/3016* (2013.01); *G01J 1/0429* (2013.01); *G01J 4/04* (2013.01)

(58) Field of Classification Search
CPC .......... G02B 5/3016; G01J 1/0429; G01J 4/04
See application file for complete search history.

(56) References Cited

U.S. PATENT DOCUMENTS 4,779,958 A * 10/1988 Kato ..................... G02F 1/1397 349/136
6,107,427 A 8/2000 Herr et al.
(Continued)

FOREIGN PATENT DOCUMENTS

EP 2094815 A1 9/2009
JP 2007-52310 A 3/2007
(Continued)

OTHER PUBLICATIONS

International Search Report for PCT/EP2022/051668, dated Apr. 21, 2022.
Written Opinion for PCT/EP2022/051668, dated Apr. 21, 2022.

*Primary Examiner* — Thanh Luu
*Assistant Examiner* — Mai Thi Ngoc Tran
(74) *Attorney, Agent, or Firm* — Sughrue Mion, PLLC

(57) ABSTRACT

The present invention relates to a method for manufacturing a spatially limited film stack comprising an optically anisotropic film on an optical sensor device with a light sensor element, such that the film stack covers the light sensor element but not the entire surface area of the optical sensor device. An electronic device manufactured according to the method of the invention can be used for analyzing the polarization state of light.

15 Claims, 8 Drawing Sheets

(56) References Cited

U.S. PATENT DOCUMENTS

| | | | |
|---|---|---|---|
| 9,612,152 B2 | 4/2017 | deJong et al. | |
| 2009/0116786 A1* | 5/2009 | Little | G02B 6/29394 385/27 |
| 2010/0059709 A1* | 3/2010 | Bachels | C09K 19/54 252/299.6 |
| 2015/0122978 A1* | 5/2015 | deJong | G01J 1/0429 250/225 |
| 2015/0301249 A1* | 10/2015 | Pau | C09K 19/56 349/124 |
| 2016/0356934 A1 | 12/2016 | Li | |
| 2018/0196179 A1 | 7/2018 | Takishita et al. | |
| 2018/0290479 A1* | 10/2018 | Geday | G07D 7/12 |
| 2018/0356941 A1* | 12/2018 | Yao | G02B 5/3083 |
| 2019/0041561 A1 | 2/2019 | Goto | |
| 2019/0385902 A1* | 12/2019 | Wang | H01L 21/02167 |
| 2020/0191648 A1 | 6/2020 | Wang et al. | |

FOREIGN PATENT DOCUMENTS

| | | | |
|---|---|---|---|
| JP | 2007052310 | A * | 3/2007 |
| WO | 01/69520 | A2 | 9/2001 |
| WO | 02/061470 | A1 | 8/2002 |
| WO | 2008/077261 | A1 | 7/2008 |
| WO | 2012/085048 | A1 | 6/2012 |
| WO | 2015/177062 | A1 | 11/2015 |
| WO | 2018/019691 | A1 | 2/2018 |

* cited by examiner

METHOD OF GENERATING A SPATIALLY LIMITED FILM STACK ON A LIGHT SENSOR ELEMENT

CROSS REFERENCE TO RELATED APPLICATIONS

This application is a National Stage of Application No. PCT/EP2022/051668 filed Jan. 26, 2022, claiming priority based on European Patent Application No. 21154779.9 filed Feb. 2, 2021.

TECHNICAL FIELD

The invention relates to methods of spatially limiting optical elements comprising polymerized or cross-linked liquid crystals.

BACKGROUND OF THE INVENTION

Analysis of the polarization state of light has become important for many applications. In some applications light of different sources are encoded by the polarization state of light. Detection of the polarization state of light falling on a surface allows to determine the amount of light that comes, for example, from two different types of light sources.

U.S. Pat. No. 9,612,152 B2 discloses a method for determining the amount of ambient light that falls on an organic light emitting diode (OLED) display with a light sensor device that is located behind the display screen, as seen from a viewer. Because the light that arrives at the sensor is a mixture of ambient light and light that is emitted from the OLED display, it is required to distinguish the light coming from the two different light sources. In one of the disclosed embodiments a circular polarizer consisting of a linear polarizer and a quarter wave retarder is arranged at the front side of the OLED display, which provides the additional benefit that reflections caused by the OLED structure are reduced. Incident ambient light that has passed the circular polarizer is circularly polarized, whereas light emitted from the OLED display is non-polarized. The light sensor device that is located at the rear side of the display has two channels. The first of the two channels detects both the ambient light and the light emitted by the display.

The second channel is equipped with a circular polarizer with opposite handedness compared to the circular polarizer on the front side of the display. Accordingly, the circularly polarized ambient light is blocked in the second channel and only light emitted from the display is detected. The intensity of the ambient light can then be determined from the difference of the light intensities detected in the two channels. The light sensor device is therefore used as an ambient light sensor. However, the patent specification does not disclose how a circular polarizer is applied to the second channel of the light sensor device.

US 2020191648 A1 also discloses an ambient light sensor element for an OLED display. Similar to the solution of U.S. Pat. No. 9,612,152 B2, a circular polarizer is arranged at the front side of the OLED display and an ambient light sensor comprising two channels is located at the rear side of the display. Both channels are equipped with circular polarizers but with opposite handedness. The circularly polarized ambient light is therefore blocked in one channel, whereas it can pass the circular polarizer in the other channel. The non-polarized light emitted from the OLED display is similarly detected by both channels. The intensity of the ambient light can be determined from the difference of the light intensities detected in the two channels. However, US 2020191648 A1 does not disclose how to apply circular polarizers with opposite handedness to the two channels of the light sensor device.

In an optical sensor device such as for the use as ambient light sensor as explained above, one or more light sensor elements may occupy part of a semiconductor chip area. It may be desired that these parts of the chip are covered by an optical film, such as a circular polarizer film, while other areas of the chip, such as the bonding pads shall not be covered by the optical film. Moreover, in an optical sensor device comprising more than one light sensor element, for example an array of light sensor elements, optical films with mutually different optical properties may be required for individual light sensor elements. It is therefore necessary to precisely restrict an optical film or layer to specific areas of a substrate or a device.

Further, for micro-optical applications, the effective optical areas to be covered by an optical film may be in the micrometre range. Therefore, it is almost impossible to use the standard optical films which have a thickness that is much larger than the dimension of the effective optical area to be covered.

Therefore, methods are required that can generate or apply thin optical films or layers with anisotropic optical properties to areas in the micrometre range with very high positional precision and high resolution.

Oriented liquid crystal polymers are known to provide high birefringence, which allows to manufacture retarder films, such as quarter wave or half wave retarders, with a layer thickness of only a few micrometers. Layers of liquid crystal polymers (LCP) can be made by coating a layer of liquid crystalline monomers on a substrate, which typically has a surface able to orient liquid crystals. After the liquid crystal monomers are oriented, they are polymerized or cross-linked in order to solidify the material. If dichroic dyes are included in the liquid crystal composition, the LCP layer absorbs light anisotropically and therefore acts as a linear polarizer.

In order to create a limited area of an LCP layer on a substrate there are in principal two approaches. In the first approach, the LCP layer is locally applied in the correct size and position, for example by printing methods. In the second approach, an LCP layer is generated in a larger area, encompassing the desired smaller area or the pattern of areas to be created, respectively. This can be done, for example, by coating. In a later step, LCP outside of the areas of the desired pattern is removed.

As an example of the first approach, WO 02/061470 A1 describes a method, in which a pattern of LCP areas is created by jet printing liquid crystal monomers in the desired pattern to a substrate, which has the ability to align liquid crystals. Subsequently, the liquid crystal monomers are crosslinked by exposure to uv-light. The big advantage of this method is that pattern generation can be controlled by a computer, which allows to create individual LCP pattern. However, the precision of size, thickness and shape may not be sufficient for the creation of well-defined LCP areas in the range of a few micrometres.

As an example of the second approach, WO2008/077261 describes a method using special formulations of liquid crystal monomers. After forming a layer of this material, typically on top of an alignment layer, the liquid crystal monomers are solidified by selective uv-irradiation only in those areas of the layer, which are desired to contain the LCP film. Subsequently, the non-crosslinked liquid crystal material is removed by washing in an appropriate solvent.

Although, the achievable lateral resolution is improved due to the use of the special material formulation compared to standard liquid crystal monomer material, the lateral resolution that can be achieved with this method may not be sufficient for high resolution applications.

SUMMARY OF THE INVENTION

An object of the present invention is, therefore, to provide an improved method for generating spatially limited optically anisotropic films or layers on top of a light sensor element as part of an optical sensor device. Another object of the present invention is to provide novel electronic devices comprising an optical sensor device with one or more light sensor elements covered with a spatially limited anisotropic optical film. A further object of the present invention is to provide applications using electronic devices of the present invention.

According to a first aspect of the invention there is provided a method for manufacturing a spatially limited film stack comprising at least one optically anisotropic film on a light sensor element of an optical sensor device, wherein the spatially limited film stack covers the light sensor element but not the entire surface area of the optical sensor device, the method comprising the steps providing an optical sensor device with a light sensor element, wherein the light sensor element does not extend over the entire area of the optical sensor device preparation of a film stack comprising a first oriented polymerized liquid crystal layer on the optical sensor device forming the spatially limited film stack by selectively removing material from the film stack by dry or wet etching, or providing a substrate preparation of a film stack comprising a first oriented polymerized liquid crystal layer on the substrate forming the spatially limited film stack by selective transfer areas of the film stack from the substrate to the optical sensor device.

Preferably, the optical sensor device comprises two or more light sensor elements and the spatially limited film stack is formed such that it does not cover all of the light sensor elements.

Preferably, the method includes the step of preparation of a film stack which comprises a first oriented polymerized liquid crystal layer and a second oriented polymerized liquid crystal layer on the optical sensor device. Another preferred method includes the step of preparation of a film stack which comprises a first, a second and a third oriented polymerized liquid crystal layer on the optical sensor device. A further preferred method includes the step of preparation of a film stack which comprises a first, a second, a third and a fourth oriented polymerized liquid crystal layer on the optical sensor device.

The terms “first”, “second”, “third” and “fourth” with regards to “oriented polymerized liquid crystal layer” are only used to refer to the individual layers. However, they shall not imply a special sequence of layers. For example, an optional third polymerized liquid crystal layer may be between the first and the second oriented polymerized liquid crystal layer.

According to a second aspect of the invention an electronic device is provided which comprises an optical sensor device with a light sensor element a spatially limited film stack comprising an oriented polymerized liquid crystal layer, wherein the spatially limited film stack covers the light sensor element, but not the full area of the optical sensor device.

Preferably, the optical sensor device comprises two or more light sensor elements and the spatially limited film stack does not cover all of the light sensor elements.

Preferably, the spatially limited film stack comprises a first oriented polymerized liquid crystal layer and a second oriented polymerized liquid crystal layer. Another preferred film stack comprises a first, a second and a third oriented polymerized liquid crystal layer.

BRIEF DESCRIPTION OF THE DRAWINGS

The invention is further illustrated by the accompanying drawing figures. It is emphasized that the various features are not necessarily drawn to scale.

DETAILED DESCRIPTION OF THE INVENTION

Figure 1A:
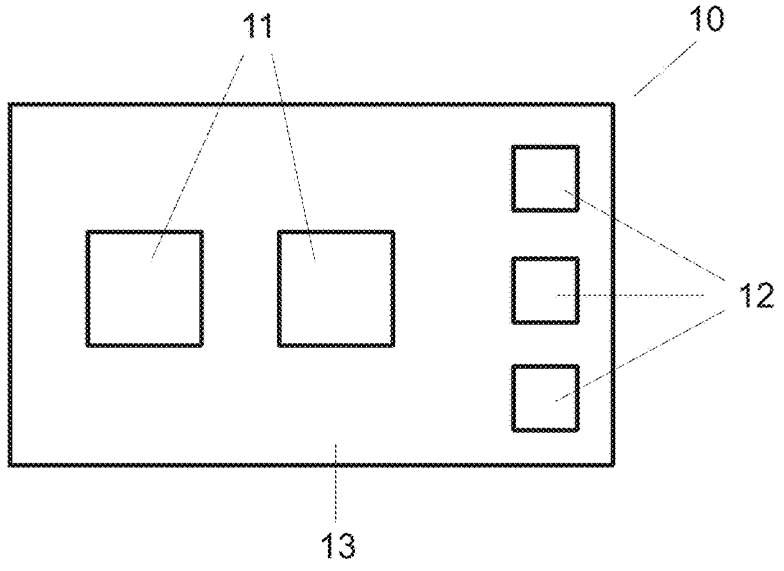
FIGS. 1*a* and 1*b* show an example of an optical sensor device with two optical sensor elements and three bonding pads in top view in FIG. 1*a* and a cross-section thereof in side view in FIG. 1*b*.

A light sensor element is an electro-optical element that is sensitive to light and converts light intensity into an electronic signal or changes conductivity of the element. A light sensor element used in the present invention may be sensitive to visible light, ultraviolet (uv) light and/or infrared (IR) light. Preferably, a light sensor element is sensitive to visible light.

In the context of this application, a light sensor element may be of any known type, such as photo diodes, photo transistors, photoresistors but may also refer to the individual pixels of a sensor array such as charge coupled device (CCD) or complementary metal oxide semiconductors (CMOS) which are used as imaging devices. Preferably, a light sensor element is a semiconductor.

In the context of this application, an optical sensor device comprises a light sensor element and other structural and/or functional elements. Preferably, the optical sensor device comprises two light sensor elements. More preferred is that the optical sensor device comprises more than two light sensor elements. Preferably, the optical sensor device comprises an array with a multitude of light sensor elements. Preferably, the optical sensor device is a charge coupled device (CCD) or a complementary metal oxide semiconductor (CMOS) device.

Preferably, the optical sensor device contains an electronic circuit, which provides signal processing. Preferably, the electronic circuit is an integrated circuit. The optical sensor device may be produced on a semiconductor wafer, such as a silicon wafer. Typically, a plurality of optical sensor devices are produced on a wafer, which are then diced to obtain the individual optical sensor devices.

The optical sensor device may have a lateral arrangement of different materials responsible for different electrical and/or non-electrical functions. Therefore, different areas of the device may have different height levels of the surface. Preferably, the structure depth, which is the maximum difference of the height levels, is less than 10 μm, more preferred less than 1 μm and most preferred less than 0.5 μm. The surface of the optical sensor device may have other locally varying properties, such as different surface tensions.

Preferably, the optical sensor device has bonding pads for electrical connections.

A "liquid crystal polymer material (LCP material)" as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after they have been oriented, for example due to contact with an alignment layer. Polymerization may be initiated by thermal treatment or by exposure to actinic light, which preferably comprises uv-light. A LCP-material may comprise only a single type of a liquid crystal compound, but may also comprise additional polymerizable and/or non-polymerizable compounds, wherein not all of the compounds have to have liquid crystalline properties. Further, an LCP material may contain additives, for example, photo-initiators, inhibitors, light stabilizers, adhesion promoters, leveling agents, IR absorbing substances, uv-absorbers, carbon nanotubes, chiral dopants and/or isotropic or anisotropic fluorescent and/or non-fluorescent dyes. Preferably, an LCP material comprises anisotropically absorbing substances, such as carbon nanotubes or dichroic dyes, which may anisotropically absorb light in the uv-range, the visible range and/or the infrared wavelength range of light. Preferably, an LCP material comprises dichroic dyes or carbon nanotubes which anisotropically absorb light in the visible wavelength range of light. In the context of this application it is assumed that anisotropically absorbing substances in an LCP layer are aligned according to the local orientation of the LCP layer. Also preferred are LCP materials comprising chiral dopants. Preferably, the LCP material is cholesteric. Suitable liquid crystal monomers are, for example, disclosed in WO00/48985. Preferred liquid crystal monomers have polymerizable groups, which are acrylate or diacrylate, methacrylate, dimethacrylate, allyl, vinyl or acrylamide. Suitable dichroic dyes are, for example, disclosed in WO2015/177062.

The terms "polymerizable" and "polymerized" shall include the meaning of "cross-linkable" and "cross-linked", respectively. Likewise, "polymerization" shall include the meaning of "cross-linking".

LCP layers as used in the present application can be formed from LCP materials, preferably dissolved in a proper solvent, by any known coating or printing methods.

Alignment of the liquid crystal molecules in an LCP layer can be achieved by different methods, such as shearing the material during or after application to a substrate or by applying the LCP material to a substrate having a surface with alignment capability, such as surfaces which were brushed, photo-aligned or have an anisotropic surface structure.

Preferably, the LCP material of an LCP layer is aligned by a layer comprising a photo-alignable material, which has been exposed to aligning light to provide a surface with alignment capability. Photo-alignment allows to easily generate an alignment surface with an orientation pattern, even in roll to roll manufacturing. In addition, photo-alignment can be applied on surfaces with a topography, since the light which generates the alignment in the photo-alignment layer can follow the surface modulation, which is not the case for most of the alternative alignment methods.

In the context of this application the term "orientation direction" shall refer to the direction along which the long axis of the liquid crystals in an LCP material or LCP layer are aligned. If the term "orientation direction" is used with regard to an alignment direction created in an alignment layer, such as a photoalignment layer, it shall refer to the orientation direction that a liquid crystal in contact with the alignment layer would adopt.

The term "orientation pattern" shall mean a pattern in an LCP layer or in an alignment layer, comprising at least two areas which differ in the orientation direction.

An oriented LCP layer, which has been made from an LCP material that does neither include anisotropically absorbing substances nor chiral dopants, is typically birefringent and acts as an optical retarder layer. The optical retardance depends on the thickness of the LCP layer, and can therefore be adjusted to any value from a few nanometers up to several micrometers. Preferably, an LCP retarder layer used in this application is designed as a quarter wave plate or as a half wave plate.

An oriented LCP layer, which has been made from an LCP material comprising anisotropically absorbing substances, absorbs light anisotropically and therefore acts as a linear polarizer in the wavelength range of the respective anisotropic absorbance. Accordingly, such an LCP material provides a coatable polarizer. It is possible to extend the wavelength range of anisotropic absorbance by including several substances, for example dichroic dyes, which anisotropically absorb in different wavelength ranges, such that the absorption curves of the individual anisotropically absorbing substances are superimposed. In this way, it is, for example, possible to cover the full visible wavelength range.

An oriented LCP layer, which has been made from an LCP material comprising chiral dopants adopts a twisted configuration and may act as a twisted retarder. Preferably, the concentration of the chiral dopant is sufficiently high, so that the LCP layer acts as a cholesteric layer, providing selective reflection in the uv-, or visible, or infrared wavelength range of light. Preferably, the selective reflection band is in the visible wavelength range of light.

In the context of the present application, a "photo-alignable material" is a material in which alignment capability for a liquid crystal material can be induced upon exposure to aligning light, independent from the photo-reaction mechanism. Suitable photo-alignable materials are, for example, materials in which upon exposure to aligning light alignment capability is induced by photo-dimerization, photo-decomposition, trans-cis isomerization or photo-fries rearrangement. Preferred are photo-alignable materials in which alignment is induced by photo-dimerization. Suitable photo-alignable materials are, for example, disclosed in U.S. Pat. No. 6,107,427.

The term "photo-aligned material" is used to refer to a photo-alignable material that has been aligned by exposure to aligning light.

The terms "photo-alignment", "photo-alignable" and "photo-aligned" are used synonymously with the terms "photo-orientation", "photo-orientable" and "photo-oriented", respectively.

The term "photo-alignment layer" is used for a layer which comprises a photo-alignable and/or photo-aligned material, no matter if it has already been exposed to aligning light or not. Accordingly, a photo-alignment layer, as used herein, may have no aligning capability as long as it has not been exposed to aligning light and has aligning capability after it has been exposed to aligning light. A photo-alignment layer is typically formed as a thin layer with a thickness in the range of a few nanometers to several hundreds of nanometers.

If the whole area of a photoalignment layer is exposed to aligning light, uniaxial alignment results. The aligning light may be shaped such that only part of the photoalignment layer is exposed to the aligning light, for example by covering certain areas by photo-masks or by scanning light beams to desired areas only. Subsequent exposure steps may be added with different polarization planes of the aligning light in order to generate an orientation pattern on the photoalignment layer. Any other method known to generate an alignment pattern by photo-alignment can be used as well, including exposure to aligning light with spatially modulated polarization plane. As a result, a plurality of orientation directions may be generated in the surface of the photoalignment layer.

The term "aligning light" shall mean light, which can induce anisotropy in a photo-orientable material and which is at least partially linearly or elliptically polarized and/or is incident to the surface of a photo-orientable substance from an oblique direction. Preferably, the aligning light is linearly polarized with a degree of polarization of more than 5:1. Wavelengths, intensity and energy of the aligning light are chosen depending on the photosensitivity of the photo-orientable substance. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 420 nm.

If the aligning light is linearly polarized, the polarization plane of the aligning light shall mean the plane defined by the propagation direction and the polarization direction of the aligning light. In case the aligning light is elliptically polarized, the polarization plane shall mean the plane defined by the propagation direction of the light and by the major axis of the polarization ellipse.

The relative terms "upper" and "lower", "above" and "below" as well as "on top of" used in combination with a layer as well as the surface of a layer are defined with regard to the position of the substrate or the optical sensor device, respectively. Accordingly, the lower part of a layer is facing the substrate or the optical sensor device, whereas the upper side is facing away from the substrate or the optical sensor device. Similarly, on top of a layer means the side of the layer opposite to the side of the layer facing the substrate or the optical sensor device, respectively.

Figure 1B:
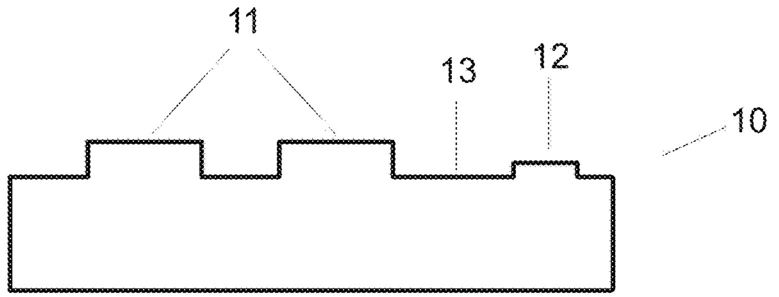

The drawing of FIG. 1*a* shows the top view of an example of an optical sensor device 10. It contains two light sensor elements 11, bonding pads 12 and an integrated circuit 13, which provides signal processing. The material at the surface of the different parts may be different. For example, the bonding pads typically comprise a metal. While the bonding pad may be a single metal layer, other areas may have a more complex structure, such as the light sensor element. Therefore, the surface in the areas of the light sensor elements, in the areas of the integrated circuit and in the areas of the bonding pads may be at different height levels, thus creating a surface topography as illustrated in FIG. 1*b*, which is a cross-section through the optical sensor device of FIG. 1*a*.

Figure 2:
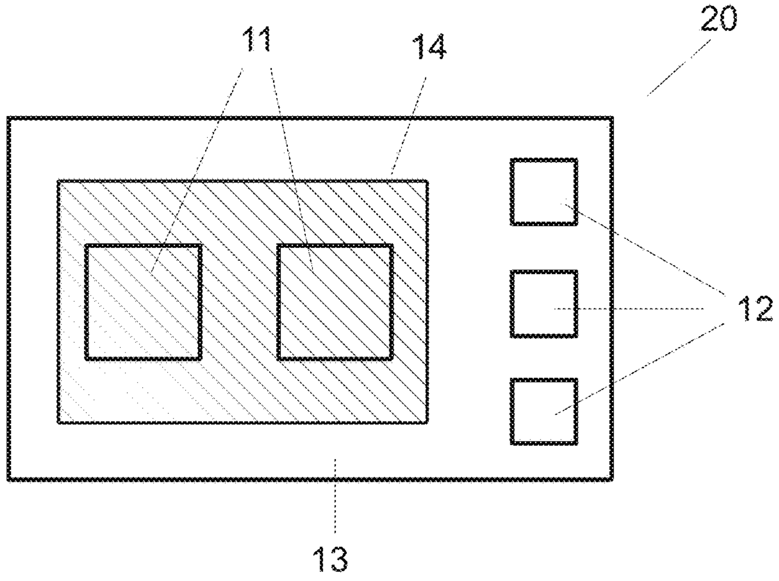
FIG. 2 shows the optical sensor device depicted in FIG. 1*a* with a film stack comprising at least one optically anisotropic film covering the light sensor elements but not the bonding pads, according to the invention.

FIG. 2 shows an optical sensor device 20, which may result when preparing a spatially limited film stack 14 over the light sensor elements 11 of the optical sensor device 10, using a method of the present invention. The spatially limited film stack 14 covers the light sensor elements but not the bonding pads of the optical sensor device. Preferably, the optical sensor device comprises two or more light sensor elements and the spatially limited film stack 14 does not cover all of the light sensor elements. This has the advantage that the non-covered light sensor element can detect light that has not been altered by the spatially limited film stack 14 and can therefore be used for reference measurement of the intensity of the incident light, regardless of, for example, the polarization state of the incident light.

The steps of a first variant of the method according to the first aspect of the invention are illustrated in FIGS. 3*a*-3*f*, in which a spatially limited film stack is formed on an optical sensor device, such as that depicted in FIG. 2. The method starts with providing an optical sensor device with a light sensor element. In the following description, the optical sensor device 10 of FIGS. 1*a* and 1*b* are used as an example, in which it is assumed that the optical sensor device is a semiconductor chip comprising two light sensor elements 11, bonding pads 12 and an integrated circuit 13. Although the description refers to a single optical sensor device, the method can be applied simultaneously to a plurality of optical sensor devices, for example on a semiconductor wafer, which is later diced into the single chips.

Figure 3A:
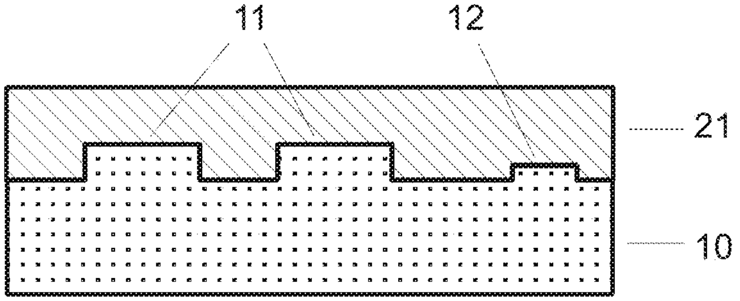
FIGS. 3*a*-3*f* illustrate the steps of a first variant of the method for manufacturing the spatially limited film stack of FIG. 2.

According to the method, a film stack 21 comprising at least one oriented polymerized liquid crystal layer is prepared on the optical sensor device 10, as shown in FIG. 3*a*. Film stack 21 may comprise additional optically anisotropic and/or isotropic layers, for example color filters, IR-filters, UV-filters, anti-reflection coatings and barrier layers. The method used to apply the individual layers of the film stack depends on the nature of the materials of the individual layers and may include different printing and coating methods, preferably spin-coating, but also vacuum deposition techniques, such as evaporation or sputtering. The layers may be applied over the entire surface area of the optical sensor device, although this is not required. It is even possible that the individual layers of the film stack do not cover the same area. Preferably, film stack 21 comprises an alignment layer for the orientation of the liquid crystals. Film stack 21 may also comprise a planarization layer between the optical sensor device and the first polymerized liquid crystal layer. A planarization layer may be required to provide a flat surface for the other layers in the film stack, in particular for the liquid crystal layer. The surface roughness of the planarization layer may be further decreased by chemical mechanical polishing (CMP). On the other hand, if the structure depth of the surface topography of the optical sensor device is low, a planarization layer may not be required. Although the upper surface of film stack 21 in FIGS. 3*a*-3*f* is depicted flat, it may adopt some surface topography from the optical sensor device, in particular if no planarization layer is applied. Depending on the materials that are used in the different steps of the method, it may also be required to include a protective layer, to protect the optical sensor device against solvents and etching treatments that are used in the different method steps.

Figure 3B:
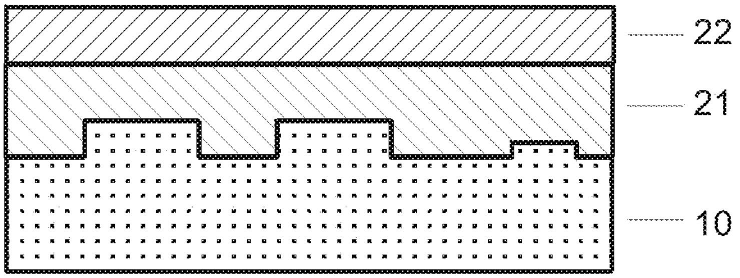
Figure 3C:
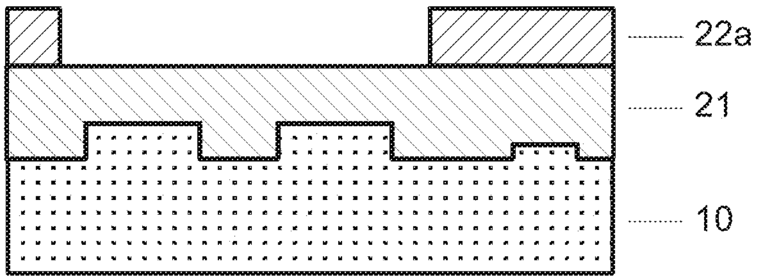

In a next step, a photo-resist layer 22 is applied, for example by coating, on top of film stack 21, as depicted in FIG. 3*b*. The photoresist is then removed in the area of the desired spatially limited film stack 14 by using a standard photo-lithography process, whereas the photoresist layer 22*a* remains outside of this area, as shown in FIG. 3*c*.

Figure 3D:
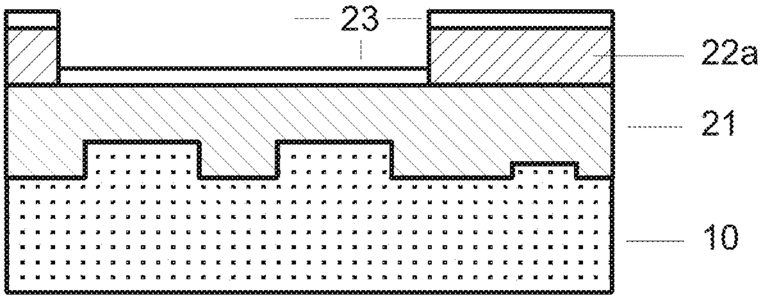
Figure 3E:
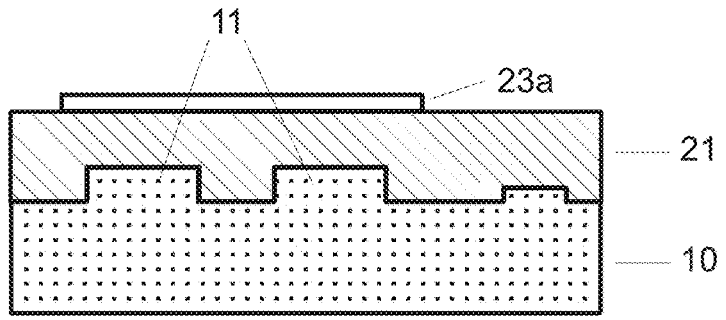

A hard mask 23 is then deposited onto the film stack as depicted in FIG. 3*d*. Subsequently, the photoresist is dissolved in an appropriate solvent, which removes the photoresist layer 22*a* together with the hard mask in the areas of layer 22*a*, as illustrated in FIG. 3*e*. The hard mask pattern 23*a* that is generated in this way covers the area of the desired spatially limited film stack 14 and protects the material below this area against the etching reactions of the following method steps. Any other method for generating the hard mask pattern 23*a* can be used alternatively. Any material with a high selectivity towards the applied dry or wet etching processes can be used for the hard mask 23. Preferably, the material for the hard mask comprises inorganic oxides, such as silicon oxides or aluminum oxides, or silicon nitride or a metal such as aluminum. More preferred is that the material for the hard mask comprises silicon dioxide. Preferably, the hard mask layer 23 is transparent. This has the advantage that it does not block the light from entry into the light sensor element and therefore it does not have to be removed after finishing the other etching steps. This may have the further advantage that it may act as a protective layer for the organic materials below the mask even after the production of the film stack on the optical sensor device has been finished.

Figure 3F:
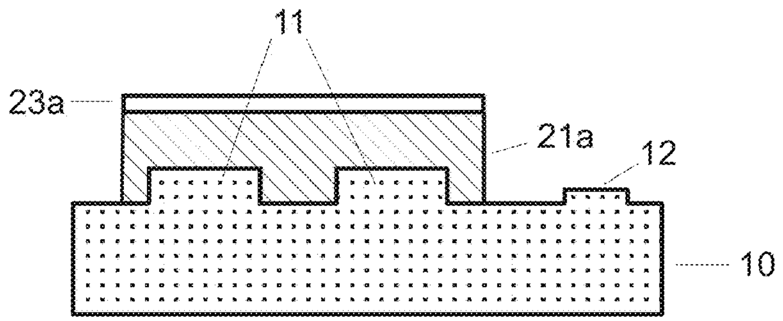

In a further step, the material of the film stack 21 is removed in the areas not covered by the hard mask pattern 23*a* by dry or wet etching. As shown in FIG. 3*f*, a spatially limited film stack 21*a*, which corresponds to spatially limited film stack 14 of FIG. 2, is formed in the desired area. Preferably the process of removing material from film stack 21 includes dry etching, preferably reactive ion etching (RIE), Inductively Coupled Plasma RIE (ICP-RIE) or plasma ashing, preferably using O2 plasma. In any case, the materials and processes should be so selected that the surface of the optical sensor device is not damaged.

Figure 4:
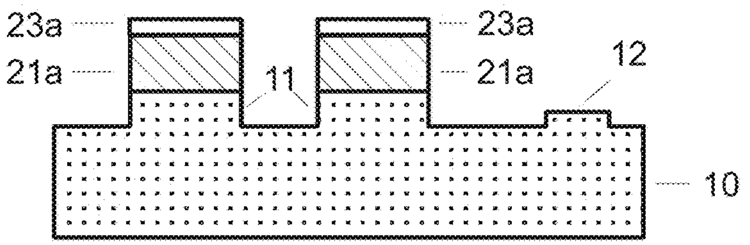
FIG. 4 shows a variant of the spatially limited film stack on the optical sensor device, in which the film stack only covers the areas of the light sensor elements.

In the process illustrated in FIGS. 3*a*-3*f* and described above, it is assumed that a single spatially limited film stack 21*a* covers the two light sensor elements 11. Depending on the application, it may be required that material has to be removed from the film stack 21 such that islands of the film stack 21 remain which are not connected with each other. For example, it may be desired that the film stack remains only on top of each of the light sensor elements, such as shown in FIG. 4, but not in the area of the gap between individual light sensors. Obviously, this requires higher precision than for the example of FIG. 3. However, it does not change the number of process steps as long as the film stacks are identical. It only requires that a different hard mask pattern 23*a* has to be generated. In the context of this application, individual, not connected areas which remain after material has been removed from the same film stack, such as from film stack 21, are considered as part of a single spatially limited film, such as the two areas of the film stack 21*a* above the two light sensor elements in FIG. 4.

Figure 5:
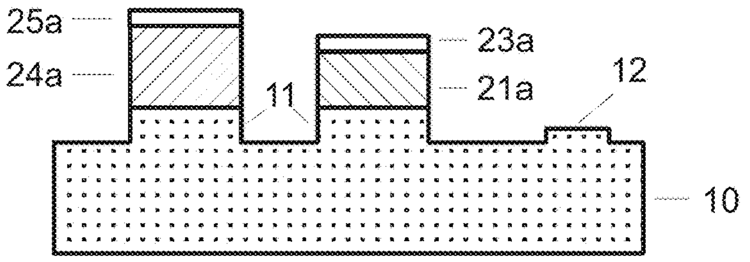
FIG. 5 shows another variant of spatially limited film stacks on the optical sensor device, in which different film stacks are applied on different light sensor elements.

In case different spatially limited film stacks are required on the different light sensor elements, as shown in FIG. 5, the method of the invention may have to be applied twice. For example, spatially limited film stack 21*a* may be prepared as described in the method above with regard to FIGS. 3*a*-3*f*, without removing the hard mask pattern 23*a*. Then the films required for the spatially limited film stack 24*a* as well as for the hard mask pattern 25*a* are applied and treated similarly as described above. Because the hard mask 23*a* has not been removed, it protects the spatially limited film stack 21*a* against the etching reactions performed for forming the shape of spatially limited film stack 24*a*. Spatially limited film stacks 21*a* and 24*a* may, for example, differ in the number of layers, the material of the layers, the thickness of layers and/or the optical function of layers.

Figure 6:
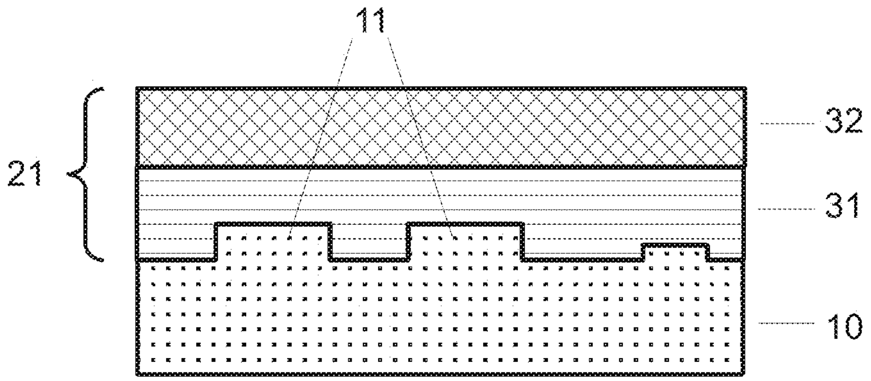
FIG. 6 shows a first embodiment of a film stack on an optical sensor device, wherein the film stack comprises a cholesteric LCP layer.

The type of layers used in film stack 21 depends on the desired optical property of the film stack. There may be additional layers which support the layer structure without having an optical function, such as a planarization layer, adhesion layers, protection layers and/or alignment layers for liquid crystals. In a first embodiment, film stack 21 comprises a cholesteric LCP layer 32 as the first oriented polymerized liquid crystal layer according to the invention, as illustrated in FIG. 6. An optional planarization layer 31, which is also depicted in the film stack of FIG. 6 may be helpful in case the optical sensor device has a surface topography with a large structure depth. The cholesteric LCP layer 32 acts as a circular polarizer within its selective reflection band. Circularly polarized light with wavelengths in the selective reflection band can only pass the cholesteric LCP layer 32 and can be detected by a light sensor element 11, if it has the proper handedness required for transmission of the cholesteric LCP layer. Hence, the device acts as an analyzer for circularly polarized light of certain wavelengths.

Preparation of the film stack 21 of FIG. 6 includes applying a planarization layer on the optical sensor device 10 using a suitable material, which is compatible with the surface materials of the optical sensor device and the cholesteric LCP material to be coated on top. Next, the cholesteric LCP layer 32 is formed by applying an LCP material which includes a chiral dopant on top of the planarization layer, preferably using a coating technique. The temperature of the LCP layer may then be increased in order to remove residual solvents and to support alignment of the liquid crystal molecules. Finally, the LCP material is crosslinked, preferably by exposure to actinic light, which concludes the preparation of the first oriented polymerized liquid crystal layer according to the invention. For some applications, it may be helpful to include an alignment layer in the film stack (not shown in FIG. 6), which supports alignment of the cholesteric liquid crystal material.

Figure 7:
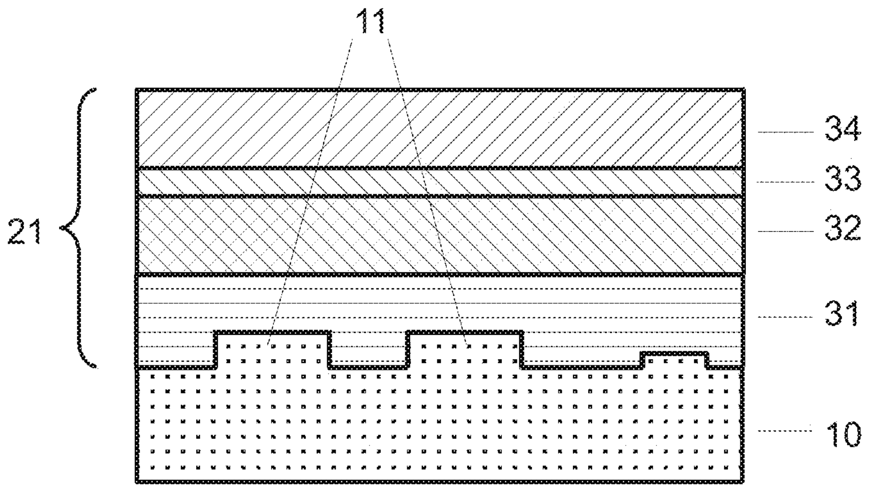
FIG. 7 shows an embodiment of a film stack on an optical sensor device, wherein the film stack comprises a cholesteric LCP layer and an LCP retarder layer.

The film stack 21 in the embodiment of FIG. 7 comprises a cholesteric LCP layer 32 as the first oriented polymerized liquid crystal layer like in FIG. 6, and in addition a second oriented polymerized liquid crystal layer 34, which is aligned by an alignment layer 33. The second LCP layer is formed as a retarder layer. The alignment layer 33 may exhibit an orientation pattern which is transferred to the liquid crystals in the LCP layer, thus forming a patterned retarder, comprising an orientation pattern. The second LCP layer is preferably designed to act as a quarter wave retarder or as a half wave retarder. If the second LCP layer is designed to act as a quarter wave retarder, then linearly polarized light incident to the film stack from above the film stack with a polarization plane at +45° or −45° to the optical axis of the LCP layer 34 is converted either into left- or right handed circularly polarized light. The circularly polarized light with wavelengths within the selective reflection band can then only pass the cholesteric LCP layer 32 and accordingly can only be detected by a light sensor element 11, if it has the proper handedness required for transmission of the cholesteric LCP layer 32. Hence, the device acts as an analyzer for linearly polarized light of certain wavelengths.

Preparation of the film stack 21 of FIG. 7 includes the process steps as described above with regard to FIG. 6. On top of the cholesteric LCP layer, an alignment layer 33 is formed by coating a suitable material and subsequently treating it to create the desired alignment capability. The alignment layer preferably comprises a photo-alignable material, in which alignment capability is created by exposure to aligning light. In this case, an optional orientation pattern can easily be generated, for example, by multiple exposure to aligning light using photomasks with the corresponding masking pattern. Subsequently, the second LCP layer is prepared on top of the alignment layer by forming a layer of an LCP material, preferably by coating or printing, optionally increasing the temperature of the layer in order to remove residual solvents and to support alignment of the liquid crystal molecules, crosslinking the LCP material, preferably by exposure to actinic light.

Figure 8:
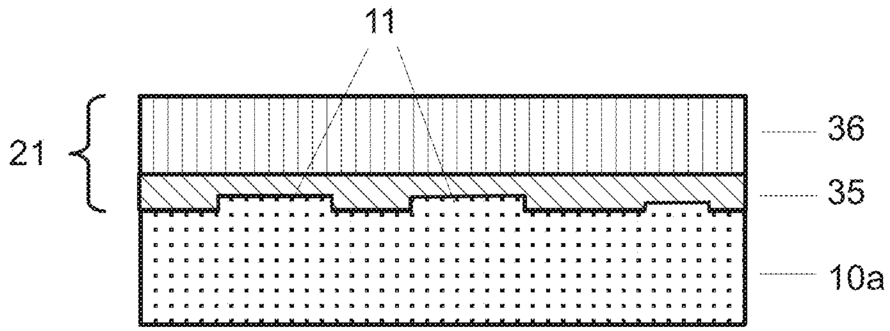
FIG. 8 shows an embodiment of a film stack on an optical sensor device, wherein the film stack comprises a linearly polarizing LCP layer.
Figure 9:
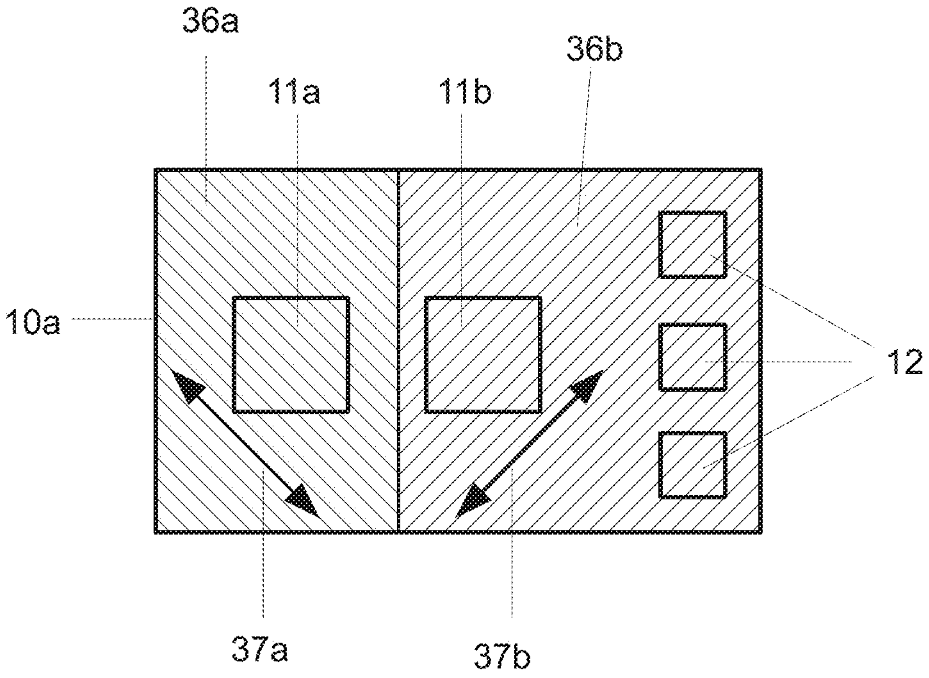
FIG. 9 shows a top view of the film stack of FIG. 8 on an optical sensor device, wherein the linearly polarizing LCP layer has an orientation pattern.

FIG. 8 shows another embodiment of a film stack 21, in which the first oriented polymerized liquid crystal layer 36 comprises anisotropically absorbing substances and therefore acts as a linear polarizer. Accordingly, the device of FIG. 8 acts as an analyzer for linearly polarized light. In the example illustrated in FIG. 8, it is assumed that the optical sensor device 10*a* has a small structure depth, such that a planarization layer is not required, although a planarization layer is still optional as in each of the embodiments. Besides the anisotropically absorbing LCP layer 36, the film stack 21 illustrated in FIG. 8 therefore only shows an alignment layer 35, which provides alignment for the liquid crystals in the anisotropically absorbing LCP layer 36. The alignment layer may exhibit an orientation pattern, in order to induce a corresponding orientation pattern in the anisotropically absorbing LCP layer 36, thus forming a patterned polarizer, which comprises areas which differ from one another by the direction of polarization. In a preferred variant of the embodiment, which is depicted as top view in FIG. 9, the optical sensor device 10*a* comprises a first light sensor element 11*a* and a second light sensor element 11*b* and the LCP polarizer 36 has an orientation pattern such that in a first area 36*a*, which covers the first light sensor element 11*a*, the LCP polarizer exhibits a first polarization direction 37*a* and in a second area 36*b*, which covers the second light sensor element 11*b*, the LCP polarizer exhibits a second polarization direction 37*b*, wherein the first polarization direction is different from the second polarization direction. Preferably, the first polarization direction 37*a* differs from the second polarization direction 37*b* by an angle between 40° and 50°, more preferred between 43° and 47° and in the optimum case 45°, or the first polarization direction 37*a* differs from the second polarization direction 37*b* by an angle between 80° and 100°, more preferred between 85° and 95° and in the optimum case 90°. In another preferred variant of the embodiment of FIG. 8 (not shown in a figure), the optical sensor device comprises a first, a second and a third light sensor element and the LCP polarizer 36 has an orientation pattern such that in a first area, which covers the first light sensor element, the LCP polarizer exhibits a first polarization direction and in a second area, which covers the second light sensor element, the LCP polarizer exhibits a second polarization direction and in a third area, which covers the third light sensor element, the LCP polarizer exhibits a third polarization direction, wherein the first, second and third polarization directions are mutually different. Preferably, the first and second polarization directions differ by an angle between 40° and 50°, more preferred between 43° and 47° and in the optimum case 45°, and the first and third polarization directions differ by an angle between 80° and 100°, more preferred between 85° and 95° and in the optimum case 90°.

In a further preferred variant of the embodiment of FIG. 8 (not shown in a figure), the optical sensor device comprises a first, a second, a third and a fourth light sensor element and the LCP polarizer 36 has an orientation pattern such that in the areas above the first, second, third and fourth light the LCP polarizer has a first, second, third and fourth polarization direction, respectively. The first, second, third and fourth polarization directions are mutually different. Preferably, the first and second polarization directions differ by an angle of 45°, the first and third polarization directions differ by an angle of 90° and the first and fourth polarization directions differ by an angle of 135°. While the above angular differences are preferred, deviations from above values are tolerated. Preferable, the deviation is not more +10° or −10°, more preferred not more than +5° or −5° and most preferred not more than +2° or −2°, respectively. An electronic device made according to this variant is preferably used for easy measurement of the stokes parameters describing the polarization state of light.

Preparation of the film stack 21 of FIG. 8 includes forming an alignment layer 35 by applying a layer of a suitable material on the optical sensor device, for example by coating, and subsequently treating it to create the desired alignment capability. The alignment layer preferably comprises a photo-alignable material, in which alignment capability is created by exposure to aligning light. In this case, an optional orientation pattern, for example required for the preferred polarizer pattern as described above, can easily be generated, for example, by multiple exposure to aligning light using photomasks with the corresponding masking pattern. Subsequently, the anisotropically absorbing LCP layer 36 is prepared on top of the alignment layer by forming a layer of an LCP material comprising anisotropically absorbing substances, preferably by coating or printing. The temperature of the layers on the device may be increased in order to remove residual solvents and to support alignment of both the liquid crystal molecules and the anisotropically absorbing substances. Finally, the LCP material is crosslinked, preferably by exposure to actinic light, which concludes the preparation of the first oriented polymerized liquid crystal layer of the embodiment of FIG. 8.

Figure 10:
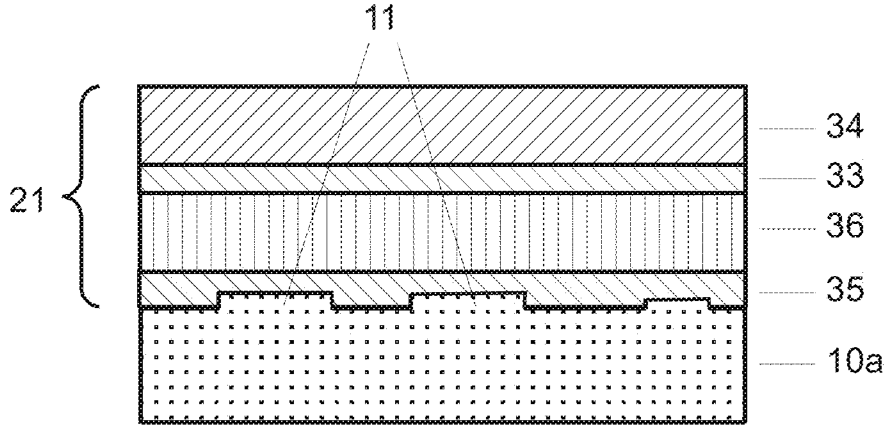
FIG. 10 shows an embodiment of a film stack on an optical sensor device wherein the film stack comprises a linearly polarizing LCP layer and an LCP retarder layer.

The film stack 21 in the embodiment of FIG. 10 comprises the alignment layer 35 and the anisotropically absorbing LCP layer 36 as the first oriented polymerized liquid crystal layer like in FIG. 8, and in addition a second oriented polymerized liquid crystal layer 34, which is aligned by an alignment layer 33. The second LCP layer is formed as a retarder layer and is preferably designed to act as a quarter wave retarder or as a half wave retarder. Preferably, there is an area in the LCP retarder layer 34 covering the area of a light sensor element, in which the optical axis direction is oriented at an angle of 0°, +45°, −45° or 90° with regard to the polarization direction of the anisotropically absorbing LCP layer 36 in the corresponding area above the same light sensor element. While any of the above angles represents an optimal angle, those skilled in the art will appreciate that the device will also operate with angles deviating from above values. Preferable, the deviation is not more +10° or −10°, more preferred not more than +5° or −5° and most preferred not more than +2° or −2°, respectively. If the optical axis direction is oriented at +45° or −45° to the polarization direction and the LCP retarder layer 34 is designed as a quarter wave retarder, circularly polarized light incident to the film stack from above is converted by the quarter wave plate into linearly polarized light with a polarization plane either parallel or perpendicular to the polarization direction of the LCP polarizer 36, depending on the handedness of the circularly polarized light. Accordingly, incident circularly polarized light of a certain handedness can be detected by the light sensor, whereas circularly polarized light of the opposite handedness cannot pass the film stack 21 and therefore does not generate a signal in the respective light sensor element. Hence, the device of FIG. 10 acts as an analyzer for circularly polarized light.

Figure 11:
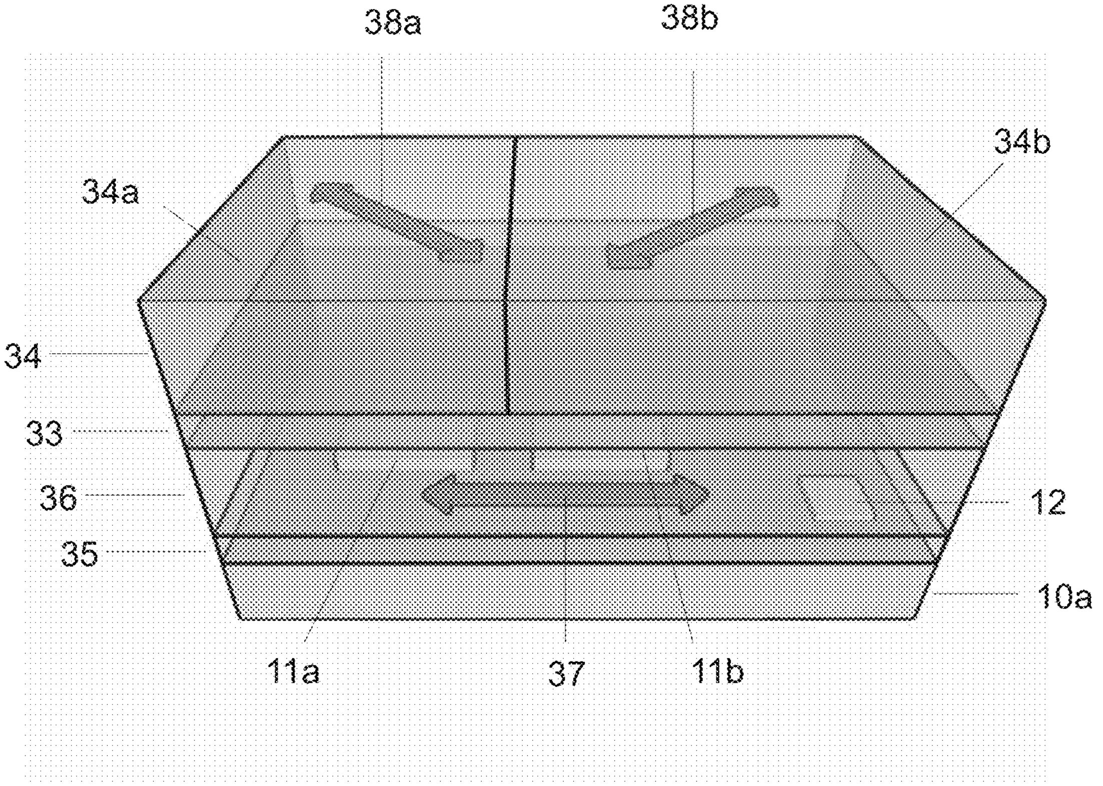
FIG. 11 shows a variant of the embodiment of FIG. 10, wherein the LCP retarder layer has an orientation pattern of the optical axis.

The alignment layer 33 may exhibit an orientation pattern which is transferred to the liquid crystals in the LCP retarder layer 34, thus forming a patterned retarder, which comprises areas which differ from one another by the direction of the optical axis. In a preferred variant of the embodiment, which is illustrated in FIG. 11, the optical sensor device 10*a* comprises a first light sensor element 11*a* and a second light sensor element 11*b*, the LCP polarizer 36 has a uniform polarization direction 37, the LCP retarder layer 34 has an orientation pattern such that in a first area 34*a*, which covers the first light sensor element 11*a*, the LCP retarder layer exhibits a first optical axis direction 38*a* and in a second area 34*b*, which covers the second light sensor element 11*b*, the LCP retarder layer exhibits a second optical axis direction 38*b*, wherein the first optical axis direction is different from the second optical axis direction. Preferably, the LCP layer 34 is designed as a quarter wave retarder and the first optical axis direction 38*a* differs from the second optical axis direction 38*b* by an angle between 80° and 100°, more preferred between 85° and 95°, most preferred by 90°, and the angle between the first optical axis direction 38*a* and the polarization direction 37 of the LCP polarizer 36 is between +40° and +50°, more preferred between +43° and +47°, in the optimum case +45°. The first light sensor element 11*a* can then detect incident circularly polarized light of opposite handedness than the second light sensor element 11*b*. The difference between the signals generated in the two light sensor elements is a measure for the degree of circular polarization of the incident light. The two light sensor elements 11*a* and 11*b* together with the film stack on top can for example be used as two channels of a detection system which can analyze the amount of left and right handed circularly polarized light in the two channels.

In a modified variant of the configuration of FIG. 11, which is not shown in a figure, the LCP layer 34 is designed as a half wave retarder and the first optical axis direction 38*a* is either parallel or perpendicular to the polarization direction 37 of the LCP polarizer 36 and the angle between the second optical axis direction 38*b* and the polarization direction 37 is between 40° and 50°, more preferred between 43° and 47°, in the optimum case 45°. The terms parallel and perpendicular shall include deviations of preferably ±10°, more preferred ±5° and most preferred ±2°. The film stack 21 then acts similar to a patterned linear polarizer. For example, if the first optical axis direction 38*a* is parallel to the polarization direction 37 of the LCP polarizer 36, linearly polarized light incident from above with the polarization direction mainly parallel to the polarization direction 37 is transmitted in area 34A of the film stack so that the first light sensor element 11*a* can detect the incident linearly polarized light, whereas in area 34*b* the polarization direction of the linearly polarized light is rotated by 90° and the light cannot pass the linear polarizer 36 and therefore cannot get to the light sensor element 11*b*. By determining the difference between the signals generated in the two light sensor elements the polarization direction of incident polarized light can be determined.

Figure 12:
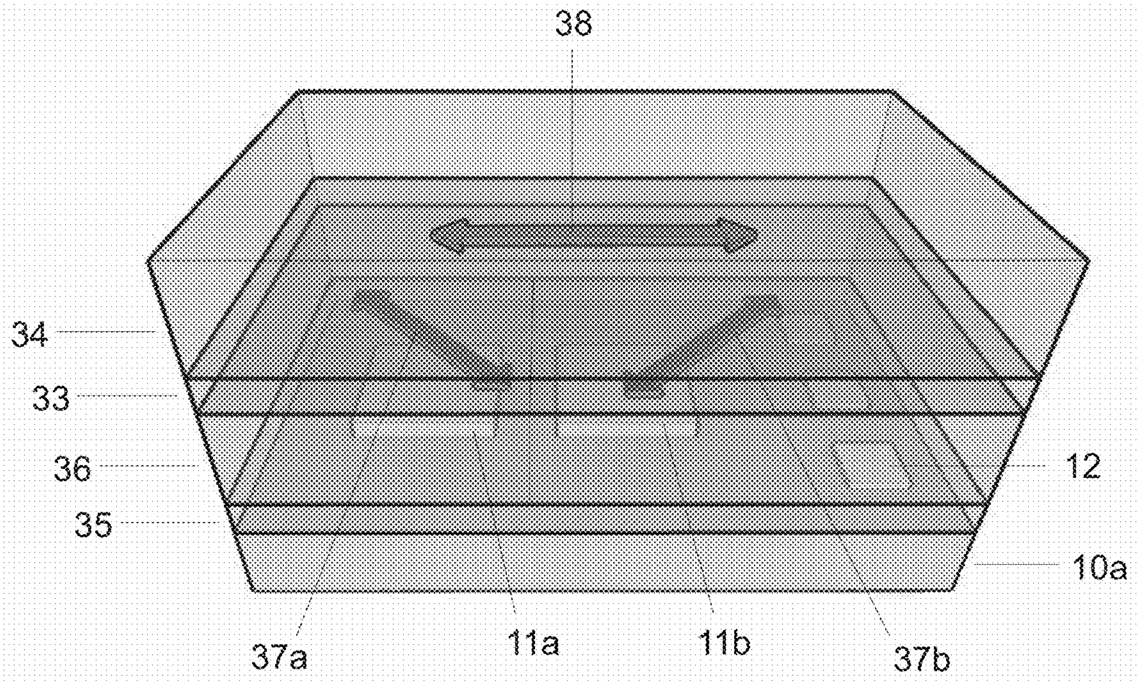
FIG. 12 shows a variant of the embodiment of FIG. 10, wherein the linearly polarizing LCP layer has an orientation pattern of the polarization direction.

Alternatively to, or in addition to patterning the alignment layer 33, the alignment layer 35 may exhibit an orientation pattern which is transferred to the liquid crystals in the anisotropically absorbing LCP layer 36, thus forming a patterned polarizer, which comprises areas which differ from one another by the polarization direction. In a preferred embodiment, which is illustrated in FIG. 12, the optical sensor device 10*a* comprises a first light sensor element 11*a* and a second light sensor element 11*b*, the LCP polarizer 36 is patterned such that in a first area, which covers the first light sensor element 11*a*, it has a first polarization direction 37*a* and in a second area, which covers the second light sensor element 11*b*, it has a second polarization direction 37*b*, wherein the first polarization direction is different from the second direction, and the LCP retarder layer 34 has a uniform orientation 38 of the optical axis. Preferably, the LCP layer 34 is designed as a quarter wave retarder and the angle between the first polarization direction 37*a* and the optical axis direction 38 is between +40° and +50°, more preferred between +43° and +47°, in the optimum case +45°, and the angle between the second polarization direction 37*b* and the optical axis direction 38 is between −40° and −50°, more preferred between −43° and −47° and in the optimum case −45°. Similar to the embodiment of FIG. 11, the first light sensor element 11*a* can detect incident circularly polarized light of opposite handedness than the second light sensor element 11*b*. The difference between the signals generated in the two light sensor elements is a measure for the degree of circular polarization of the incident light.

In more complex embodiments, wherein the number of light sensor elements on the optical sensor device is higher than two, both the optical axis direction of the LCP retarder layer 34 and the polarization direction of the anisotropically absorbing LCP layer 36 may be patterned.

Preparation of a film stack 21 according to FIGS. 11-13 includes the process steps as described above with regards to FIG. 8. On top of the anisotropically absorbing LCP layer 36, an alignment layer 33 is formed by coating a suitable material and subsequently treating it to create the desired alignment capability. The alignment layer preferably comprises a photo-alignable material, in which alignment capability is created by exposure to aligning light. In this case, an optional orientation pattern can easily be generated, as described already above. Subsequently, the LCP retarder layer 34 is prepared on top of the alignment layer by forming a layer of an LCP material, preferably by coating or printing, optionally increasing the temperature of the layer in order to remove residual solvents and to support alignment of the liquid crystal molecules and crosslinking the LCP material, preferably by exposure to actinic light.

Preferably, the film stack 21 comprises a homeotropically oriented polymerized liquid crystal layer, preferably as a second or third oriented polymerized liquid crystal layer. Because of the homeotropic orientation, the optical axis is normal to the layer plane and therefore the homeotropic LCP layer acts as an out of plane retarder, also known as a c-plate retarder. Preferably, the configurations of film stacks 21 described above with regards to FIGS. 7-13 comprise an additional homeotropically oriented polymerized liquid crystal layer. Because of the vertical orientation of the liquid crystals in a homeotropic LCP retarder, it does not need an alignment layer which provides an in-plane orientation direction. However, it may helpful that prior to applying the LCP material for the homeotropic LCP layer, a thin layer of a material with a proper surface tension is applied on the film stack, which supports homeotropic orientation for liquid crystals.

Preferably, the film stack 21 comprises an oriented polymerized liquid crystal layer, wherein the liquid crystal molecules are tilted relative to the layer plane, such that it forms a retarder layer with oblique optical axis, also known as o-plate retarder.

Preferably, the film stack 21 comprises an oriented polymerized liquid crystal layer, wherein the refractive index perpendicular to the layer plane is smaller than the average refractive index within the layer plane, also known as a negative c-plate retarder.

According to a second variant of the method of the invention, a film stack comprising a first oriented polymerized liquid crystal layer is prepared on a substrate and later selective areas of the film stack are transferred from the substrate to the optical sensor device such that the spatially limited film stack only covers the desired areas.

Figure 13A:
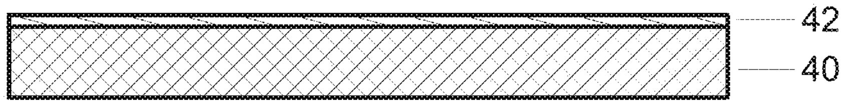
FIGS. 13*a*-13*f* illustrate the steps of a second variant of the method for manufacturing the spatially limited film stack of FIG. 2.

The second variant of the method of the invention is illustrated in FIGS. 6 *a-f* and starts with providing a substrate 40 (FIG. 13*a*). A substrate that can be used in the method may comprise or consist of any material. Preferably, the substrate comprises plastic, glass or metal. The substrate may be rigid or flexible and can have any form or shape. In case the substrate is flexible, it is preferred that it is a plastic or metal foil. Preferably, the substrate is prepared as a transfer foil, which supports easy transfer of the film stack to the optical sensor device. Preferably, the substrate is transparent.

The substrate may comprise additional layers, such as organic, dielectric or metallic layers. The layers can have different functions. For example, an organic layer may be coated as a primer layer which increases compatibility of the materials to be coated with the substrate. Preferably, the substrate comprises a release layer 42 which supports removing the layers applied above the release layer from the substrate. Preferably, the release layer is a thermal release layer, which releases upon increasing the temperature of the substrate. The release layer may be omitted if the adhesion between substrate and the film stack is weak. Release layer 42 is therefore optional.

Figure 13B:
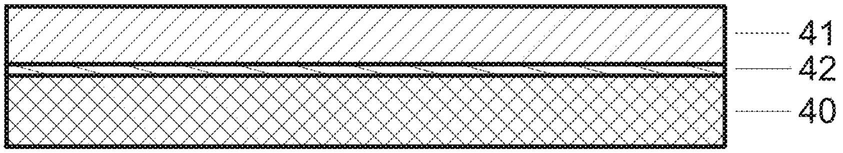

According to the method, a film stack 41 comprising at least one oriented polymerized liquid crystal layer is prepared on the substrate, for example by coating or printing, as depicted in FIG. 13*b*. The film stack 41 may comprise additional optically anisotropic and/or isotropic layers, similar to those described for film stack 21 above, for example alignment layers, polarizing layers, color filters, IR-filters, UV-filters, anti-reflection coatings and barrier layers. The method used to apply the individual layers of the film stack depends on the nature of the materials of the individual layers and may include different printing and coating methods but also vacuum deposition techniques, such as evaporation or sputtering.

The substrate may be moving during deposition of the individual layers. For example, it is possible to produce individual layers in a roll to roll process by depositing the respective materials onto a moving flexible foil, which is preferably plastic or metallic.

Preferably, the film stack comprises an alignment layer for the orientation of liquid crystals.

Figure 13C:
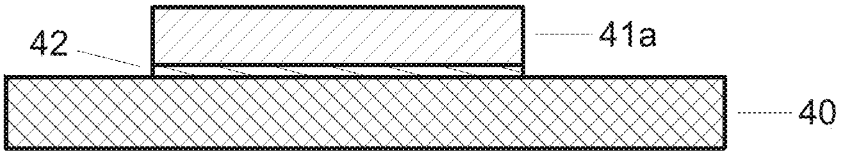

In order to transfer only selective areas of the film stack prepared on the substrate, the material outside the areas to be transferred is preferably removed. There are different methods to selectively remove materials from the film stack on the substrate, such as ablation methods using particle and/or electromagnetic radiation. The particle radiation may consist of atoms, molecules, ions and/or electrons. Electromagnetic radiation may use IR, visible, UV light or x-rays. Preferably, the materials are selectively removed by laser ablation. Another method to selectively remove materials from the film stack comprises photo-lithographic methods in combination with dry or wet etching. It is also possible to use the polymerizable liquid crystal material itself as a photoresist. The liquid crystal monomers are then cross-linked only in the areas desired to be transferred to the optical sensor device, for example by selective exposure to uv-light using a photomask. In the areas not exposed to uv-light the liquid crystal material is not crosslinked and can be washed out with a proper solvent. As a result of selectively removing materials, a film stack 41*a* is formed which has the desired area to be transferred to the optical sensor device, as shown in FIG. 13*c*. It does not matter whether the optional release layer 42 is removed outside the area of film stack 41*a* or not.

Figure 13D:
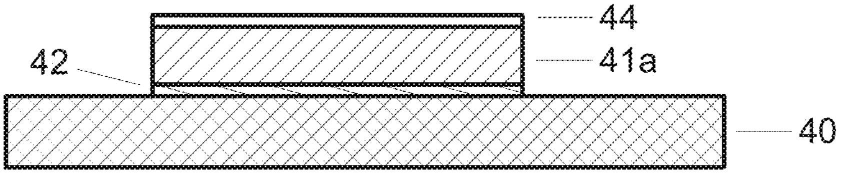
Figure 13E:
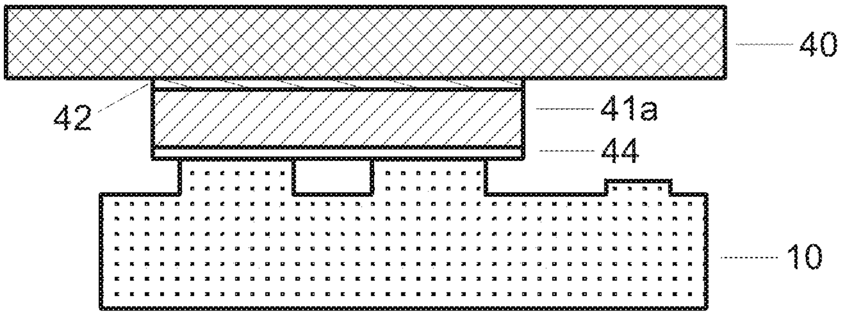
Figure 13F:
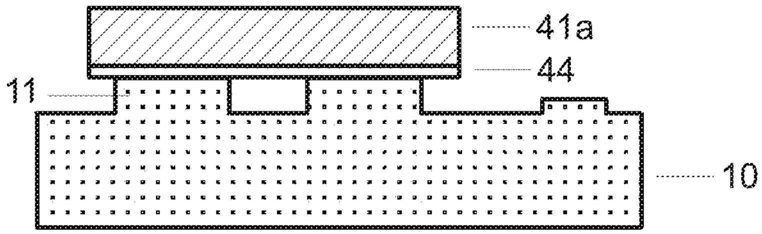

In order to precisely transfer the film stack 41*a* to the light sensor element of the optical sensor device, registration marks may be required on both the optical sensor device and on the substrate 40. An optional adhesive layer 44 may be applied on top of the film stack 41*a* to provide sufficient adhesion between the light sensor element and the transferred film stack, as shown in FIG. 13*d*. Although not necessarily required, the use of an adhesive layer 44 is preferred. Alternatively, an adhesive layer may be applied to the optical sensor device. Preferably, the adhesive layer comprises a pressure sensitive adhesive. Transfer is performed by laminating the film stack 41*a*, preferably in register with the optional registration marks, to the optical sensor device 10, as depicted in FIG. 13*e* (registration marks not shown). If the substrate comprises a thermal release layer, heat may be applied during the lamination process in order to release the substrate simultaneously with lamination. After removing the substrate 40 the light sensor elements 11 of the optical sensor device 10 are covered by film stack 41*a*, as illustrated in FIG. 13*f*.

The function of an optical sensor device with a spatially limited film stack on a light sensor element shall be the same regardless of the method that has been used to apply the spatially limited film stack on the light sensor element. In particular, the first and second variant of the method of the invention are intended to result in the same optical function of the spatially limited film stack on top of the light sensor element. This requires that the sequence of the oriented polymerized liquid crystal layers in the spatially limited film stack on top of the light sensor resulting from processing according to the two variants of the methods is identical. Accordingly, the LCP layers in the spatially limited film stack 41*a* after transfer to the light sensor elements 11 and that of the corresponding LCP layers in the spatially limited film stack 21*a* have the same sequence. Hence, to achieve the optical properties explained above with regard to film stack 21 and the related FIGS. 6-12, the different types of LCP layers have to be applied on the substrate according to the second variant of the method such that the LCP layers in the spatially limited film stack 41*a* transferred to the light sensor elements 11 have the same sequence, when viewed from the light sensor element, as the corresponding LCP layers in spatially limited film stack 21*a* and accordingly also in film stack 21. For example, in order to realize the optical function of film stack 21 in FIG. 10 by the second variant of the method, the LCP retarder layer 34 would be the lowest LCP layer that is applied on the substrate for the stack 41 in FIG. 13*b*. The polarizing LCP layer 36 would then be coated above the LCP retarder layer 34. Accordingly, the sequence of the LCP layers is inverted with regard to that in film stack 21. After selective transfer of the film stack according to the method of FIGS. 13*c*-13*f*, the sequence of the LCP layers in spatially limited film stack 41*a* on top of the light sensor elements is identical to that of film stack 21 of FIG. 10. Of course, in the transferred spatially limited film stack 41*a* the alignment layers used to align the LCP layers are on top of the respective LCP layers, whereas in film stack 21 they are below the respective LCP layers. However, as the alignment layers do not contribute to the optical properties of the film stack, their position does not change the optical function of the film stack.

Instead of directly transferring film stack 41*a* to the optical sensor device 10, following the method illustrated in FIGS. 13*e-f*, the film stack 41 or the spatially limited film stack 41*a* may first be transferred to a second substrate, then further processed similar to the methods described above and subsequently transferred to the optical sensor device 10 as spatially limited film stack 41*a*. As the sequence of the LCP layers may be inverted upon each transfer of the film stack, the sequence in which the LCP layers are applied to the first substrate may be identical to the sequence of the LCP layers in stack 21 of FIGS. 6-12 in order to achieve the same optical function.

In any of the above methods for providing alignment for the liquid crystals in the LCP material it may be helpful to increase the temperature of the LCP layer after deposition of the LCP material.

As described above, a film stack may comprise one or more oriented polymerized liquid crystal layer. Preferably, at least one polymerized liquid crystal layer in a film stack is oriented by a layer comprising a photo-alignable substance, which has been exposed to aligning light to provide a surface with alignment capability.

For any of the film stacks comprising more than one polymerized liquid crystal layers, for example those described with regard to film stacks 21 in FIGS. 8 and 11-13, it is preferred that alignment layers between polymerized liquid crystal layers are avoided by adding a suitable photo-alignable material in the LCP material which is used for the lower LCP layer. This LCP layer has then in addition to its optical function also the function of an alignment layer and is therefore a photo-alignable LCP layer. The methods that can be used for generating alignment in a photo-alignable LCP layer are the same as those for generating alignment in a photo-alignment layer. Methods for preparation of photo-alignable LCP layers as well as suitable materials are, for example, disclosed in WO2018/019691, which is hereby incorporated by reference.

In a preferred method of the invention an optical sensor device is provided, which comprises a first light sensor element and a second light sensor element and a film stack is prepared on top of the light sensor elements, which comprises one or more oriented polymerized liquid crystal layer(s), wherein at least in one polymerized liquid crystal layer an orientation pattern is generated, such that the orientation of the liquid crystals in the area above the first light sensor element is different from the orientation in the area above the second light sensor element.

Any the embodiments of film stacks described above may also comprise additional layers for different purposes.

Electronic devices according to the second aspect of the invention comprise an optical sensor device with a light sensor element and a spatially limited film stack comprising an oriented polymerized liquid crystal layer, wherein the spatially limited film stack covers the light sensor element, but not the full area of the optical sensor device.

Preferred electronic devices are those which result from the embodiments of the methods according to the first aspect of the invention as described above. In particular, preferred electronic devices are those illustrated in FIGS. 3*f*, 4-12 as well as 13*f* and further described above as well as the different variants, which, although not shown in a figure are explained in the description above.

According to a third aspect of the invention, different applications are provided which make use of the electronic devices according to the second aspect of the invention.

Most of the electronic devices provided according to the second aspect of the invention can be used for analyzing the polarization state of light. In a first preferred use, an electronic device according to the invention is used to measure the stokes parameters describing the polarization state of light, as described further above. Preferably, at least one oriented polymerized liquid crystal layer (34, 36) of spatially limited film stack 21*a* comprises an orientation pattern with two or three or four different orientation directions in areas covering different light sensor elements.

Figure 14:
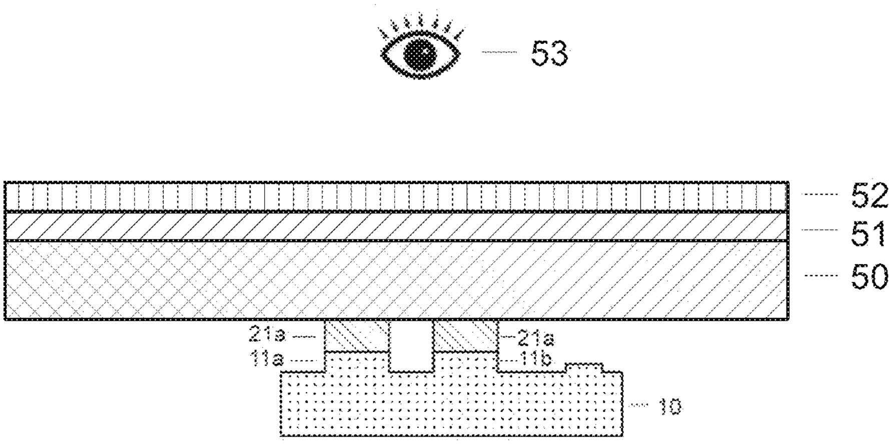
FIG. 14 shows the use of an electronic device according to the invention as an ambient light sensor on the rear side of a display.

In a second preferred use, an electronic device 20 according to the invention is used as an ambient light sensor behind an electrooptical display 50, as seen from a viewer, and illustrated in FIG. 14. Preferably the display is an OLED display. Preferably, a circular polarizer, which preferably comprises a linear sheet polarizer 52 and a quarter waver retarder film 51, are arranged at the front side of the display, which is the top side in FIG. 14. The electronic device 20 comprises two or more light sensor elements and the spatially limited film stack 21*a* comprises a first and a second oriented polymerized liquid crystal layer (34, 36), wherein the first oriented polymerized liquid crystal layer (36) acts as a linear polarizer and the second oriented polymerized liquid crystal layer (34) acts as a quarter wave retarder and wherein the first oriented polymerized liquid crystal layer (36) is located between the light sensor elements and the second oriented polymerized liquid crystal layer (34).

Examples

Materials Used in the Examples

Compounds

Photo-Alignment Material PA

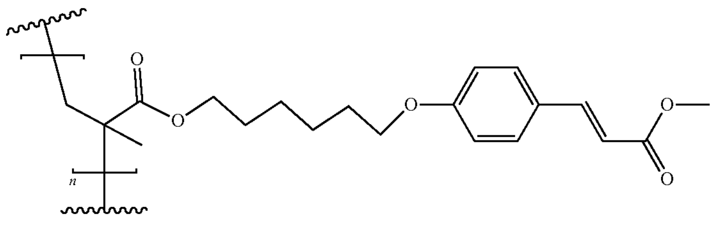

Synthesized as described in patent application WO2012/085048 A1

Crosslinkable Liquid Crystal Compound LCC

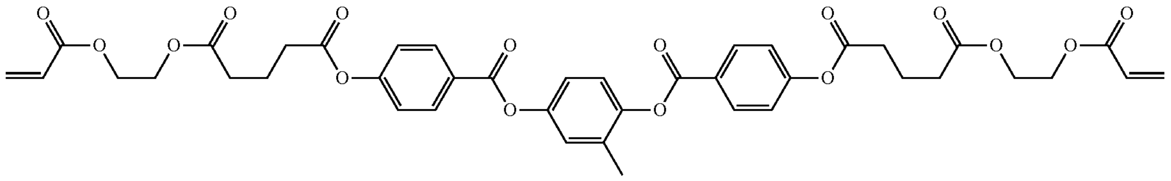 [SMILES: C=CC(=O)OCCOC(=O)CCCC(=O)Oc1ccc(C(=O)Oc2ccc(OC(=O)c3ccc(OC(=O)CCCC(=O)OCCOC(=O)C=C)cc3)c(C)c2)cc1]

Dichroic Dye dDye

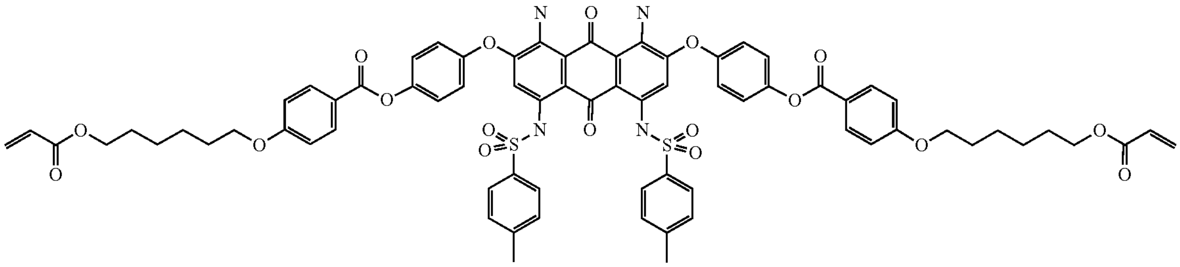

Prepared according to WO2015/177062.

Compositions

Polymerizable Liquid Crystal Material M-LCP

| | |
|---|---|
| 95.4 wt % | LCC |
| 4 wt % | Irgacure 907 (BASF) |
| 0.5 wt % | Tego Flow 300 (Evonik) |
| 0.1 wt % | BHT (Aldrich) |

Polymerizable Liquid Crystal Material M-dLCP, Comprising a Dichroic Dye

| | |
|---|---|
| 87.8 wt % | LCC |
| 10 wt % | dDye |
| 2 wt % | Irgacure 369 (BASF) |
| 0.2 wt % | BHT (Aldrich) |

Solutions

S-LPP

The solution S-LPP is prepared by dissolving 3 wt % of the photo-alignment material PA in 97 wt % Methoxy propyl acetate and stirring the solution for 30 minutes at room temperature.

S-LCP

The solution S-LCP is prepared by dissolving 10 wt % of M-LCP in 90 wt % of a solvent mixture of 80 wt % Methoxy propyl ketone, 10 wt % Dioxalane and 10 wt % Cyclohexanone and stirring the solution for 30 minutes at room temperature.

S-dLCP

The solution S-dLCP is prepared by dissolving 40 wt % of M-dLCP in 60 wt % of a solvent mixture of 80% MEK and 20% Cyclohexanone and stirring the solution for 30 minutes at room temperature.

Example of the First Variant of the Method of the Invention

The example describes the preparation of a stack of layers above two light sensor elements of an optical sensor device, such that the bonding pads of the device are not covered, and such that the layer stack acts as a patterned circular polarizer with opposite handedness in the areas covering the first and second light sensor elements. A multitude of optical sensor devices, each of them comprising two light sensor elements and bonding pads, were provided on a semiconductor wafer. The top surfaces of the light sensor elements, the bonding pads and some other areas of each optical sensor device were found to be at different height levels by analysis with a surface profilometer. Accordingly, the wafer exhibited a certain surface topography.

The surface of the semiconductor wafer was activated with an $O_2$ plasma using the following parameters: power 80% (200 W, 40 kHz), $O_2$ flow 5 sccm, time 5 min.

A planarization layer was then prepared on the wafer by spin coating (2'500 rpm for 60 s, followed by 3'000 rpm for 4 s) self-leveling material Level™ M10-44 (Brewer Science) on top of the wafer, which was then annealed at 100° C. for 1 min on a hot plate, subsequently exposed at room temperature to 1'500 mJ/cm$^2$ UVA light under $N_2$ atmosphere and then baked at 140° C. for 2 min on a hot plate. The resulting planarization layer had the effect that the structure depth of the surface topography was reduced, as found by analysis with a surface profilometer.

Photo-alignment material solution S-LPP was then coated onto the planarization layer by means of spin-coating at 1'700 rpm for 30 s. The generated film was annealed for 10 min at 100° C. on a hot plate. Then the film was exposed at room temperature to 225 mJ/cm$^2$ UVB light, which was linearly polarized parallel to a reference axis on the wafer.

Subsequently, solution S-dLCP was coated onto the LPP layer by means of spin coating (300 rpm for 40 s, followed by 3'000 rpm for 4 s). The resulting film was annealed for 90 s at 90° C. on a hot plate. The film was then exposed at room temperature to 2'000 mJ/cm$^2$ UVA light under $N_2$ atmosphere in order to solidify the layer by cross-linking. When observing the layer made from S-dLCP with a linear polarizer it was found that the layer on the wafer acts as a linear polarizer.

A solution of Dymax 4021 (20 wt % solid content in MPA) was then coated directly onto the dLCP layer by means of spin coating (1'700 rpm for 30 s) and baked for 60 s at 80° C. on a hot plate in order to form a barrier layer. The film was then exposed at room temperature to 1'500 mJ/cm$^2$ UVA light under $N_2$ atmosphere. The barrier layer is optional but may be helpful in protecting the dLCP layer against the solvents used in the preparation of further layers.

A second LPP layer was prepared on top of the barrier layer by coating solution S-LPP by means of spin-coating at 1700 rpm for 30 s and annealing for 10 min at 100° C. on a hot plate. A photomask with a proper design was arranged above the coated side of the wafer such that only the areas above each of the first of the two light sensor elements on the multitude of optical sensor devices were transparent whereas the other areas of the photomask were opaque. The film was then exposed at room temperature through the photomask to 444 mJ/cm$^2$ UVB light, which was linearly polarized along a direction of 135° with respect to the above-mentioned reference axis on the wafer. Then, after removing the photomask, the film was exposed again at room temperature to 223 mJ/cm$^2$ UVB light, which was linearly polarized along a direction of 45° with respect to the above-mentioned reference axis on the wafer.

A quarter wave retarder layer with a local variation of the optical axis according to the orientation pattern generated by the double exposure of the LPP layer was prepared by coating solution S-LCP onto the second LPP layer by means of spin coating (1'800 rpm for 120 s) and annealing for 75 s at 80° C. on a hot plate. The film was then exposed at room temperature to 1'500 mJ/cm$^2$ UVA light under $N_2$ atmosphere.

A photoresist layer was prepared by coating the negative photoresist AZ nLOF 2035 (MicroChemicals GmbH) onto the LCP retarder layer by means of spin coating (150 rpm for 15 s, followed by 2'000 rpm for 60 s) and further baking for 60 s at 110° C. on a hot plate.

A photomask with a proper design was arranged above the photoresist layer on top of the wafer such that for each optical sensor device an opaque area of the photomask encompassed the two light sensor elements whereas for the remaining areas, including the bonding pads, of each optical sensor device the photomask was transparent. The photoresist layer was then exposed at room temperature through the photomask to 44 mJ/cm$^2$ UVB light and then baked for 120 s at 110° C. on a hot plate. Further, the coated semiconductor wafer was rinsed with AZ 400K (MicroChemicals GmbH) diluted in DI water (1:2.5) for 2 min, then rinsed with DI water, blown with dry $N_2$ and then baked for 120 s at 110° C. on a hot plate. After this process, the LCP layer surface was partially exposed.

A thin layer of $SiO_2$ with a thickness of 100 nm was deposited on top of the layer structure such that it covered the remaining photoresist layer and the exposed part of the LCP layer, by means of physical vapor deposition (PVD).

The wafer was then immersed in TechniStrip NI555 (MicroChemicals GmbH) at a temperature of 60° C. for 40 min. This process step removed the photoresist layer together with the $SiO_2$ layer that covered the photoresist layer. The part of the $SiO_2$ layer that covered the exposed regions of the LCP layer remained intact. The wafer was then rinsed with DI water and blown with dry $N_2$.

The wafer was then dry-etched by means of $O_2$ Reactive Ion Etching (RIE), in a chamber with base pressure 2.5×10$^5$ mbar, $O_2$ flow 48 sccm, pressure 200 mTorr, RIE power 200 W, reflected power 4 W, DC voltage 228 V, temperature 45° C. and time 40 min.

The invention and different embodiments can be summarized by the following items:

1. A method for manufacturing a spatially limited film stack (14, 21*a*, 24*a*, 41*a*) comprising at least one optically anisotropic film (32, 34, 36) on a light sensor element (11, 11*a*, 11*b*) of an optical sensor device (10, 10*a*), wherein the spatially limited film stack covers the light sensor element but not the entire surface area of the optical sensor device, the method comprising the steps providing an optical sensor device (10, 10*a*) with a light sensor element (11, 11*a*, 11*b*), wherein the light sensor element does not extend over the entire area of the optical sensor device preparation of a film stack (21) comprising a first oriented polymerized liquid crystal layer (32, 36) on the optical sensor device forming the spatially limited film stack (14, 21*a*, 24*a*) by selectively removing material from the film stack by dry or wet etching, or providing a substrate (40)

preparation of a film stack (41) comprising a first oriented polymerized liquid crystal layer (32, 36) on the substrate forming the spatially limited film stack (41*a*) by selective transfer of areas of the film stack from the substrate to the optical sensor device (10).

2. Method according to item 1, wherein the provided optical sensor device (10, 10*a*) contains an electronic circuit, which provides signal processing and is preferably an integrated circuit (13).

3. Method according to any preceding item, wherein the optical sensor device comprises two or more light sensor elements (11, 11*a*, 11*b*) and the spatially limited film stack is formed such that it does not cover all of the light sensor elements.

4. Method according to any preceding item, wherein the first oriented polymerized liquid crystal layer (36) comprises anisotropically absorbing substances.

5. Method according to any preceding item, wherein the first oriented polymerized liquid crystal layer (32) is formed by applying an LCP material which includes a chiral dopant.

6. Method according to any preceding item, wherein a film stack (21, 41) is prepared, which comprises a first oriented polymerized liquid crystal layer (32, 34, 36) and a second oriented polymerized liquid crystal layer (34) on the optical sensor device.

7. Method according to item 6, wherein the second oriented polymerized liquid crystal layer (34) is formed as a retarder layer.

8. Method according to any preceding item, wherein a film stack (21, 41) is prepared, which comprises one or more oriented polymerized liquid crystal layer (32, 34, 36) and at least one polymerized liquid crystal layer is oriented by a layer comprising a photo-alignable substance (33,35), which has been exposed to aligning light to provide a surface with alignment capability.

9. Method according to any preceding item, wherein the optical sensor device comprises a first light sensor element (11*a*) and a second light sensor element (11*b*) and a film stack (21, 41) is prepared, which comprises one or more oriented polymerized liquid crystal layer(s) (32, 34, 36), wherein at least in one polymerized liquid crystal layer (34, 36) an orientation pattern is generated, such that the orientation of the liquid crystals in the area above the first light sensor element (11*a*) is different from the orientation in the area above the second light sensor element (11*b*).

10. Method according to any preceding item, comprising the steps providing an optical sensor device (10, 10*a*) with a light sensor element (11, 11*a*, 11*b*), wherein the light sensor element does not extend over the entire area of the optical sensor device preparation of a film stack (21) comprising a first oriented polymerized liquid crystal layer (32, 36) on the optical sensor device preparation of a hard mask pattern (23*a*, 25*a*) on top of the film stack, which covers the area of the desired spatially limited film stack (14, 21*a*, 24*a*)

forming the spatially limited film stack (14, 21*a*, 24*a*) by selectively removing material from the film stack by dry or wet etching the film stack in the area which is not covered by the hard mask.

11. Method according to item 10, wherein the hard mask comprises silicon nitride or inorganic oxides, preferably silicon oxides more preferred silicon dioxide.

12. Method according to any preceding item, comprising the steps providing an optical sensor device (10, 10*a*) with a light sensor element (11, 11*a*, 11*b*), wherein the light sensor element does not extend over the entire area of the optical sensor device preparation of a film stack (21) comprising a first oriented polymerized liquid crystal layer (32, 36) on the optical sensor device forming the spatially limited film stack (14, 21*a*, 24*a*) by selectively removing material from the film stack by dry etching, preferably reactive ion etching (RIE), Inductively Coupled Plasma RIE (ICP-RIE) or plasma ashing, preferably using O2 plasma.

13. An electronic device (20) comprising an optical sensor device (10, 10*a*) with a light sensor element (11, 11*a*, 11*b*)

a spatially limited film stack (14, 21*a*, 24*a*, 41*a*) comprising an oriented polymerized liquid crystal layer (32, 34, 36), wherein the spatially limited film stack covers the light sensor element, but not the full area of the optical sensor device.

14. Electronic device according to item 13, wherein the spatially limited film stack (14, 21*a*, 24*a*, 41*a*) comprises a first oriented polymerized liquid crystal layer and a second oriented polymerized liquid crystal layer, and preferably a third oriented polymerized liquid crystal layer.

15. Electronic device according to any of items 13-14, wherein the optical sensor device (10, 10*a*) contains an electronic circuit, which provides signal processing and is preferably an integrated circuit (13).

16. Electronic device according to any of items 13-15, wherein the optical sensor device comprises two or more light sensor elements and the spatially limited film stack does not cover all of the light sensor elements.

17. Electronic device according to any of items 13-16, wherein the first oriented polymerized liquid crystal layer (32, 36) is a cholesteric LCP layer or acts as a linear polarizer.

18. Electronic device according to any of items 14-17, wherein the second oriented polymerized liquid crystal layer (34) is a retarder layer, preferably with quarter wave or half wave retardance.

19. Electronic device according to any of items 13-18, wherein the spatially limited film stack (14, 21*a*, 24*a*, 41*a*) comprises one or more oriented polymerized liquid crystal layers (32, 34, 36) of which at least one is oriented by a layer (33,35) comprising a photo-aligned substance.

20. Electronic device according to any of items 14-19, wherein the first oriented polymerized liquid crystal layer (36) acts as a linear polarizer and the second oriented polymerized liquid crystal layer (34) acts as a quarter wave retarder.

21. Electronic device according to any of items 13-20, wherein the optical sensor device (10, 10*a*) comprises a first light sensor element (11*a*) and a second light sensor element (11*b*) and a spatially limited film stack (14, 21*a*, 24*a*, 41*a*) covering both light sensor elements comprises one or more oriented polymerized liquid crystal layer(s) (32, 34, 36), wherein at least one of the polymerized liquid crystal layers (34, 36) comprises an orientation pattern, such that the orientation of the liquid crystals in the area above the first light sensor element (11*a*) is different from the orientation in the area above the second light sensor element (11*b*).

22. Electronic device according to item 21, wherein the first oriented polymerized liquid crystal layer (36) acts as a linear polarizer and the second oriented polymerized liquid crystal layer (34) acts as a quarter wave retarder and wherein the first oriented polymerized liquid crystal layer (36) is located between the light sensor elements and the second oriented polymerized liquid crystal layer (34).

23. Use of an electronic device of any of items 13-22 for analyzing the polarization state of light.

24. Use of an electronic device of any of items 13-22 in a display setup, located behind the display as seen from a viewer, as an ambient light sensor device for analyzing the intensity of ambient light.

The invention claimed is:

1. A method for manufacturing a spatially limited film stack (14, 21*a*, 24*a*) comprising at least one optically anisotropic film (32, 34, 36) on a light sensor element (11, 11*a*, 11*b*) of an optical sensor device (10*a*), comprising a first light sensor element (11*a*) and a second light sensor element (11*b*), wherein the spatially limited film stack (14, 21*a*, 24*a*) covers the light sensor element (11, 11*a*, 11*b*) but not the entire surface area of the optical sensor device (10*a*), the method comprising the steps:

providing the optical sensor device (10*a*) with a light sensor element (11, 11*a*, 11*b*), wherein the light sensor element (11, 11*a*, 11*b*) does not extend over the entire area of the optical sensor device (10*a*), preparing a film stack (21) comprising one or more oriented polymerized liquid crystal layer(s) (32, 34, 36) including a first oriented polymerized liquid crystal layer (32, 36) on the optical sensor device (10*a*), wherein at least in one polymerized liquid crystal layer (34, 36) an orientation pattern is generated, such that the orientation of the liquid crystals in the area above the first light sensor element (11*a*) is different from the orientation in the area above the second light sensor element (11*b*), and forming the spatially limited film stack (14, 21*a*, 24*a*) by selectively removing material from the film stack (21) by dry or wet etching.

2. The method according to claim 1, wherein the provided optical sensor device (10*a*) contains an electronic circuit, which provides signal processing and is preferably an integrated circuit (13).

3. The method-according to claim 1, wherein the first oriented polymerized liquid crystal layer (32, 36) comprises anisotropically absorbing substances or a chiral dopant.

4. The method according to claim 1, wherein the film stack (21) is prepared, which comprises the first oriented polymerized liquid crystal layer (32, 36) and a second oriented polymerized liquid crystal layer (34) on the optical sensor device (10*a*), wherein the second oriented polymerized liquid crystal layer (34) is preferably formed as a retarder layer.

5. The method according to claim 1, comprising the steps:

providing the optical sensor device (10*a*) with the light sensor element (11, 11*a*, 11*b*), wherein the light sensor element (11, 11*a*, 11*b*) does not extend over the entire area of the optical sensor device (10*a*);

preparing the film stack (21) comprising the first oriented polymerized liquid crystal layer (32, 36) on the optical sensor device (10*a*);

preparing a hard mask (23) with a pattern (23*a*, 25*a*) on top of the film stack (21), which covers the area of the desired spatially limited film stack (14, 21*a*, 24*a*), wherein the hard mask (23) preferably comprises silicon nitride or inorganic oxides; and forming the spatially limited film stack (14, 21*a*, 24*a*) by selectively removing material from the film stack (21) by dry or wet etching the film stack (21) in the area which is not covered by the hard mask (23).

6. The method according to claim 5, wherein the hard mask comprises silicon oxides.

7. The method according to claim 6, wherein the hard mask comprises silicon dioxide.

8. The method according to claim 1, comprising the steps:

providing the optical sensor device (10*a*) with a light sensor element (11, 11*a*, 11*b*), wherein the light sensor element (11, 11*a*, 11*b*) does not extend over the entire area of the optical sensor device (10*a*);

preparing the film stack (21) comprising the first oriented polymerized liquid crystal layer (32, 36) on the optical sensor device (10*a*);

forming the spatially limited film stack (14, 21*a*, 24*a*) by selectively removing material from the film stack (21) by reactive ion etching (RIE), Inductively Coupled Plasma RIE (ICP-RIE) or plasma ashing, preferably using O2 plasma.

9. An electronic device (20) comprising:

an optical sensor device (10*a*) with a light sensor element (11, 11*a*, 11*b*) comprising a first light sensor element (11*a*) and a second light sensor element (11*b*); and a spatially limited film stack (14, 21*a*, 24*a*) comprising one or more oriented polymerized liquid crystal layer (s) (32, 34, 36), wherein the spatially limited film stack (14, 21*a*, 24*a*) covers both light sensor elements (11*a*, 11*b*), but not the full area of the optical sensor device (10*a*), wherein at least in one polymerized liquid crystal layer (34, 36) an orientation pattern is generated, such that the orientation of the liquid crystals in the area above the first light sensor element (11*a*) is different from the orientation in the area above the second light sensor element (11*b*).

10. The electronic device (20) according to claim 9, wherein the spatially limited film stack (14, 21*a*, 24*a*) comprises a first oriented polymerized liquid crystal layer (32, 36) and a second oriented polymerized liquid crystal layer, and preferably a third oriented polymerized liquid crystal layer.

11. The electronic device (20) according to claim 10, wherein a second oriented polymerized liquid crystal layer (34) is a retarder layer, preferably with quarter wave or half wave retardance.

12. The electronic device (20) according to claim 9, wherein the optical sensor device (10*a*) contains an electronic circuit, which provides signal processing and is preferably an integrated circuit (13).

13. The electronic device (20) according to claim 9, wherein the first oriented polymerized liquid crystal layer (32, 36) is a cholesteric LCP layer or acts as a linear polarizer.

14. A method comprising use of an electronic device of claim 9 for analyzing a polarization state of light.

15. A method comprising the use of the electronic device (20) of claim 9 in a display setup, located behind the display as seen from a viewer, as an ambient light sensor device (10*a*) for analyzing the intensity of ambient light.

* * * * *